United States Patent
Wang et al.

(10) Patent No.: US 8,379,542 B2
(45) Date of Patent: Feb. 19, 2013

(54) METHOD AND APPARATUS FOR SHARING CELL-ID BETWEEN SITES AND DETERMINING CELL-ID FOR SITE IN COOPERATIVE COMMUNICATION

(75) Inventors: Yi Wang, Shanghai (CN); Xiaoyan Bi, Shanghai (CN); Dageng Chen, Shanghai (CN); Jiayin Zhang, Shanghai (CN); Yong Jiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/476,719

(22) Filed: May 21, 2012

(65) Prior Publication Data

US 2012/0231805 A1     Sep. 13, 2012

Related U.S. Application Data

(63) Continuation of application No. PCT/CN2010/079156, filed on Nov. 26, 2010.

(30) Foreign Application Priority Data

Mar. 9, 2010     (CN) .......................... 2010 1 0129115

(51) Int. Cl.
*H04L 12/28* (2006.01)
*H04J 3/06* (2006.01)

(52) U.S. Cl. .......................... 370/254; 370/350; 370/503
(58) Field of Classification Search .......................... None
See application file for complete search history.

(56) References Cited

U.S. PATENT DOCUMENTS

| | | | |
|---|---|---|---|
| 7,920,598 B2 * | 4/2011 | Luo | 370/509 |
| 8,014,424 B2 * | 9/2011 | Luo | 370/503 |
| 8,189,541 B2 * | 5/2012 | Swarts et al. | 370/336 |
| 8,223,908 B2 * | 7/2012 | Gaal et al. | 375/354 |
| 2008/0043702 A1 * | 2/2008 | Moon et al. | 370/342 |
| 2009/0080407 A1 * | 3/2009 | Onggosanusi et al. | 370/350 |
| 2010/0177683 A1 * | 7/2010 | Lindoff et al. | 370/328 |
| 2010/0317343 A1 * | 12/2010 | Krishnamurthy et al. | 455/435.1 |
| 2011/0090820 A1 * | 4/2011 | Hussein et al. | 370/255 |
| 2011/0269449 A1 * | 11/2011 | Kazmi et al. | 455/422.1 |
| 2011/0317780 A1 * | 12/2011 | Kang et al. | 375/260 |

FOREIGN PATENT DOCUMENTS

CN     101361393 A     2/2009
WO     WO 2008/144746 A1     11/2008

OTHER PUBLICATIONS

International Search Report issued in corresponding PCT Patent Application No. PCT/CN2010/079156, mailed Mar. 10, 2011.
Office Action issued in corresponding Chinese Patent Application No. 201010129115.2, mailed Nov. 30, 2012.
Search Report issued in corresponding Chinese Patent Application No. 201010129115.2, mailed Nov. 30, 2012.

(Continued)

*Primary Examiner* — Gregory Sefcheck
(74) *Attorney, Agent, or Firm* — Brinks Hofer Gilson & Lione

(57) ABSTRACT

A method and an apparatus for sharing a cell-ID between sites and determining a cell-ID of a site in cooperative communication includes: obtaining a synchronization sequence set, where the synchronization sequence set is used to determine a cell-ID (Cell-ID); and allocating synchronization sequences in the same synchronization sequence set to multiple sites, where the synchronization sequences in the same synchronization sequence set are used to determine antenna unit IDs (AU-ID) of respective sites. Through the embodiments, a system overhead may be decreased.

13 Claims, 7 Drawing Sheets

OTHER PUBLICATIONS

Popović et al., "Primary Synchronization Signal in E-UTRA" IEEE 2008.

Siemens, "SCH Design" Agenda Item 8.3.2, 3GPP TSG RAN WG1 #46. Tallinn, Estonia, Aug. 28-Sep. 1, 2006. R1-062341.

Fujitsu, "Discussion on DL Coordinated Multipoint Transmission" Agenda Item 12, 3GPP TSG-RAN1 #54. Jeju, Korea, Aug. 18-22, 2008. R1-083115.

Huawei, "Understanding on Type 1 and Type 2 Relay" Agenda Item 15.3, 3GPP TSG RAN WG1 meeting #57. San Francisco, USA, May 3-8, 2009. R1-091803.

Motorola, "R1-093954: Further Considerations for Supporting Dual-Layer Beamforming in LTE Rel1-9" Agenda Item 6.4.4, 3GPP TSG RAN WG1 #58BIS. Miyazaki, Japan, Oct. 12-16, 2009.

* cited by examiner

METHOD AND APPARATUS FOR SHARING CELL-ID BETWEEN SITES AND DETERMINING CELL-ID FOR SITE IN COOPERATIVE COMMUNICATION

CROSS-REFERENCE TO RELATED APPLICATIONS

This application is a continuation of International Application No. PCT/CN2010/079156, filed on Nov. 26, 2010, which claims priority to Chinese Patent Application No. 201010129115.2, filed on Mar. 9, 2010 both of which are hereby incorporated by reference in their entireties.

FIELD OF THE APPLICATION

The present application relates to a mobile communication technology, and in particular, to a method and an apparatus for sharing a cell-ID between sites and determining a cell-ID of a site in cooperative communication.

BACKGROUND OF THE APPLICATION

In a long term evolution (Long Term Evolution, LTE) technology, to enhance coverage performance of a cell and to improve a throughput rate for an edge user of the cell become important problems. Multi-base station/site cooperative communication is a technical trend for improving performance for the edge user of the cell. At present, proposed systems, such as a coordinated multi-point transmission and reception (Coordinated Multi-point Transmission and Reception, CoMP) system, a relay (Relay) system, and a distributed antenna system, are all technical manners for implementing the multi-base station/site cooperative communication.

In LTE, a base station includes three cells. Cells where user equipments (User Equipment, UE) are located may be distinguished by cell-IDs (Cell-ID). If different base stations are distinguished by using $N_{ID}^{(1)}$ (cell group ID), different cells served by the same base station are distinguished by using $N_{ID}^{(2)}$ (ID of a cell in a group). Then, Cell-ID=$3N_{ID}^{(1)}$+$N_{ID}^{(2)}$, $N_{ID}^{(1)} \in [0,1,2,\ldots,167]$, and $N_{ID}^{(2)} \in [0,1,2]$. $N_{ID}^{(1)}$ and $N_{ID}^{(2)}$ are uniquely determined by a secondary synchronization signal (Secondary Synchronization Signals, SSS) and a primary synchronization signal (Primary Synchronization Signals, PSS) respectively, where a secondary synchronization signal and a primary synchronization signal are sent by a base station. The PSS and SSS constitute synchronization signals in an LTE system, and are used to implement time frequency synchronization for downlink signals in a stage where a UE searches a cell and identify a Cell-ID of a cell where the UE resides.

In a frequency division duplex (Frequency Division Duplex, FDD) system, in a time domain, a PSS is transmitted in a last orthogonal frequency division multiplexing (Orthogonal Frequency Division Multiplexing, OFDM) symbol in a first timeslot of each frame, and an SSS is transmitted in a previous OFDM symbol of the OFDM symbol in which the PSS is transmitted. In a frequency domain, a synchronization signal is transmitted only at 1.25 MHz in a central position of a cell transmission bandwidth. This 1.25 MHz bandwidth corresponds to 72 sub-carriers. The synchronization signal occupies only 62 sub-carriers and 5 sub-carriers on each side are used as a protection bandwidth.

A PSS sequence uses a Zadoff-Chu (ZC) sequence in the frequency domain and is made up of a ZC sequence with one bit (bit) removed, where the ZC sequence has three different 63-bit (bit) roots (roots are 25, 29, and 34 respectively). An SSS sequence is formed by assembling two 31-bit m sequences, and 168 sequences are formed in total. The preceding $N_{ID}^{(1)}$ is an ID of the SSS sequence and $N_{ID}^{(2)}$ is an ID of the PSS sequence.

A cell with an independent Cell-ID has an independent channel, for example, a downlink broadcast channel, a control channel and a pilot, an uplink control channel, and a random access channel (Random Access Channel, RACH) are also relatively independent. For cells with different Cell-IDs, scrambling and encryption on data channels are also different. Related information about cells with different Cell-IDs is different, and therefore, in a handover process of an existing LTE system, a high layer needs to be enabled. Even through when two cells are served by the same base station, home information of the UE still needs to be updated at a network side due to change of a Cell-ID, so that new data is directly sent to a target base station. Meanwhile, during air interface cooperation, because Cell-IDs of cells are different, a system cooperation overhead is larger.

SUMMARY OF THE APPLICATION

Embodiments provide a method and an apparatus for sharing a cell-ID between sites and determining a cell-ID of a site in cooperative communication, so as to solve an existing problem that a system overhead is larger in the prior art.

An embodiment provides a method for sharing a Cell-ID between sites in cooperative communication, which includes:

obtaining a synchronization sequence set, where the synchronization sequence set is used to determine a cell-ID (Cell-ID); and allocating synchronization sequences in the same synchronization sequence set to multiple sites, where the synchronization sequences in the same synchronization sequence set are used to determine antenna unit IDs (AU-ID) of respective sites.

An embodiment further provides a method for sharing a Cell-ID between sites in cooperative communication. When sites that need to share a cell-ID (Cell-ID) serve the same cell group, the method includes:

determining sites that need to share a Cell-ID; and allocating a secondary synchronization signal (SSS) sequence and the same primary synchronization signal (PSS) sequence to the sites, where the SSS sequence is used to determine a Cell-ID and the PSS sequence is used to determine an antenna unit ID (AU-ID).

An embodiment provides an apparatus for sharing a cell-ID (Cell-ID) between sites in cooperative communication, which includes:

a generating module, configured to obtain a synchronization sequence set, where the synchronization sequence set is used to determine a cell-ID (Cell-ID); and an allocating module, configured to allocate synchronization sequences in the same synchronization sequence set to multiple sites, where the synchronization sequences in the same synchronization sequence set are used to determine antenna unit IDs (AU-ID) of respective sites.

An embodiment further provides an apparatus for sharing a cell-ID (Cell-ID) between sites in cooperative communication. When sites that need to share a cell-ID (Cell-ID) serve the same cell group, the apparatus includes:

a determining module, configured to determine sites that need to share a Cell-ID; and an allocating module: configured to allocate a secondary synchronization signal (SSS) sequence and the same primary synchronization signal (PSS) sequence to the sites, where the SSS sequence is used to determine a Cell-ID and the PSS sequence is used to determine an antenna unit ID (AU-ID).

An embodiment provides a method for determining a cell-ID of a site in cooperative communication, which includes:

receiving synchronization signals sent from multiple sites, where synchronization sequences that correspond to the synchronization signals sent from the multiple sites belong to the same synchronization sequence set;

determining a cell-ID (Cell-ID) according to the synchronization sequence set and determining an antenna unit ID (AU-ID) according to the synchronization sequences, where the multiple sites correspond to the same Cell-ID.

An embodiment further provides a method for determining a cell-ID of a site in cooperative communication, which includes:

receiving synchronization signals sent from multiple sites, where the synchronization signals include a primary synchronization signal (PSS) and a secondary synchronization signal (SSS), and the sites have the same PSS but different SSSs;

determining a cell-ID (Cell-ID) according to the SSS and determining an antenna unit ID (AU-ID) according to the PSS, where the multiple sites correspond to the same Cell-ID.

An embodiment further provides a mobile communication system, which includes:

a baseband signal processing unit and multiple sites;

The baseband signal processing unit allocates synchronization sequences in the same synchronization sequence set to multiple sites, where the synchronization sequence set is used to determine a cell-ID (Cell-ID), the multiple sites correspond to the same Cell-ID, and the synchronization sequences in the same synchronization sequence set are used to determine antenna unit IDs (AU-ID) of respective sites.

It can be seen from the preceding technical solutions that, with the method and apparatus for sharing a cell-ID between sites in cooperative communication, by allocating a synchronization sequence to a site, a UE may obtain the same Cell-ID through calculation according to the synchronization sequence. In this way, sites in the cooperative communication correspond to the same Cell-ID and a system overhead is decreased.

DETAILED DESCRIPTION OF THE EMBODIMENTS

Figure 1:
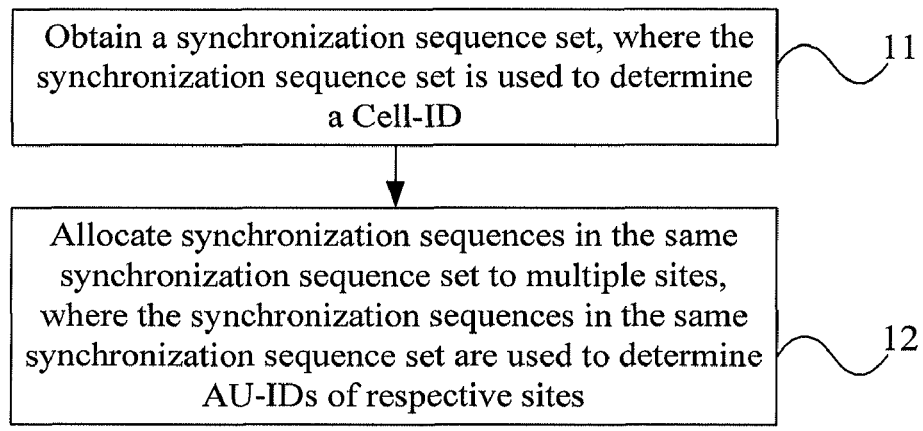
FIG. 1 is a schematic flow chart of a method according to a first embodiment.

FIG. 1 is a schematic flow chart of a method according to a first embodiment. The method includes:

Step 11: Obtain a synchronization sequence set, where the synchronization sequence set is used to determine a Cell-ID.

Step 12: Allocate synchronization sequences in the same synchronization sequence set to multiple sites, where the synchronization sequences in the same synchronization sequence set are used to determine antenna unit IDs (AU-ID) of respective sites.

A site corresponds to a geographically physical site and a direction of a service at this physical site. The physical site may be a base station, a Radio Remote Unit (RRU), or a relay.

The multiple sites refer to two or more sites.

Because a number of a synchronization sequence is used to determine a Cell-ID, when synchronization sequences in the same synchronization sequence set are allocated to different sites, these different sites correspond to the same Cell-ID, and may share some of same channels to decrease a system overhead. Because different synchronization sequences in a synchronization sequence set have different numbers, different sites correspond to different antenna unit IDs (Antenna Unit, AU-ID) to distinguish respective sites. Furthermore, a site may have one or multiple antennas. Multiple antennas may be identified by different port numbers. Two antennas of one site may have the same port number. A UE (User Equipment) can identify only one port antenna. Port numbers of antennas of different sites may be the same, and may also be different. The port of an antenna is identified by a cell-ID, an AU-ID, and a port number. In this embodiment, a synchronization sequence that is used to represent a Cell-ID and an AU-ID is mainly focused.

In this embodiment, sites correspond to the same Cell-ID, so that a system overhead may be decreased.

Figure 2:
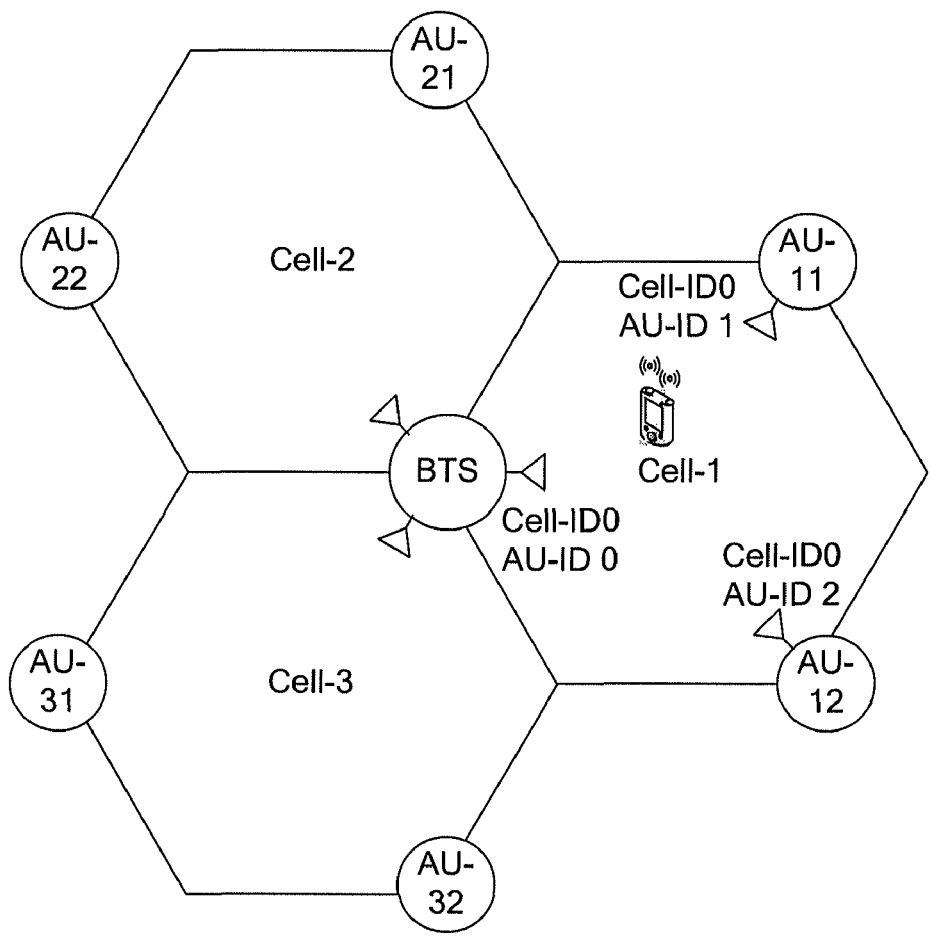
FIG. 2 is a schematic structural diagram of a system according to a second embodiment.

FIG. 2 is a schematic structural diagram of a system according to a second embodiment. Referring to FIG. 2, the system includes base stations and three cells served by each base station, that is, a cell-1, a cell-2, and a cell-3. At the same time, an antenna unit (antenna unit, AU) may be disposed at the edge of a cell to improve a throughput rate for an edge user and expand a coverage scope of the cell. In this embodiment, for example, two AUs need to be added for each cell. Sites that need to serve the same cell correspond to the same Cell-ID to avoid a problem caused by different Cell-IDs.

Figure 3:
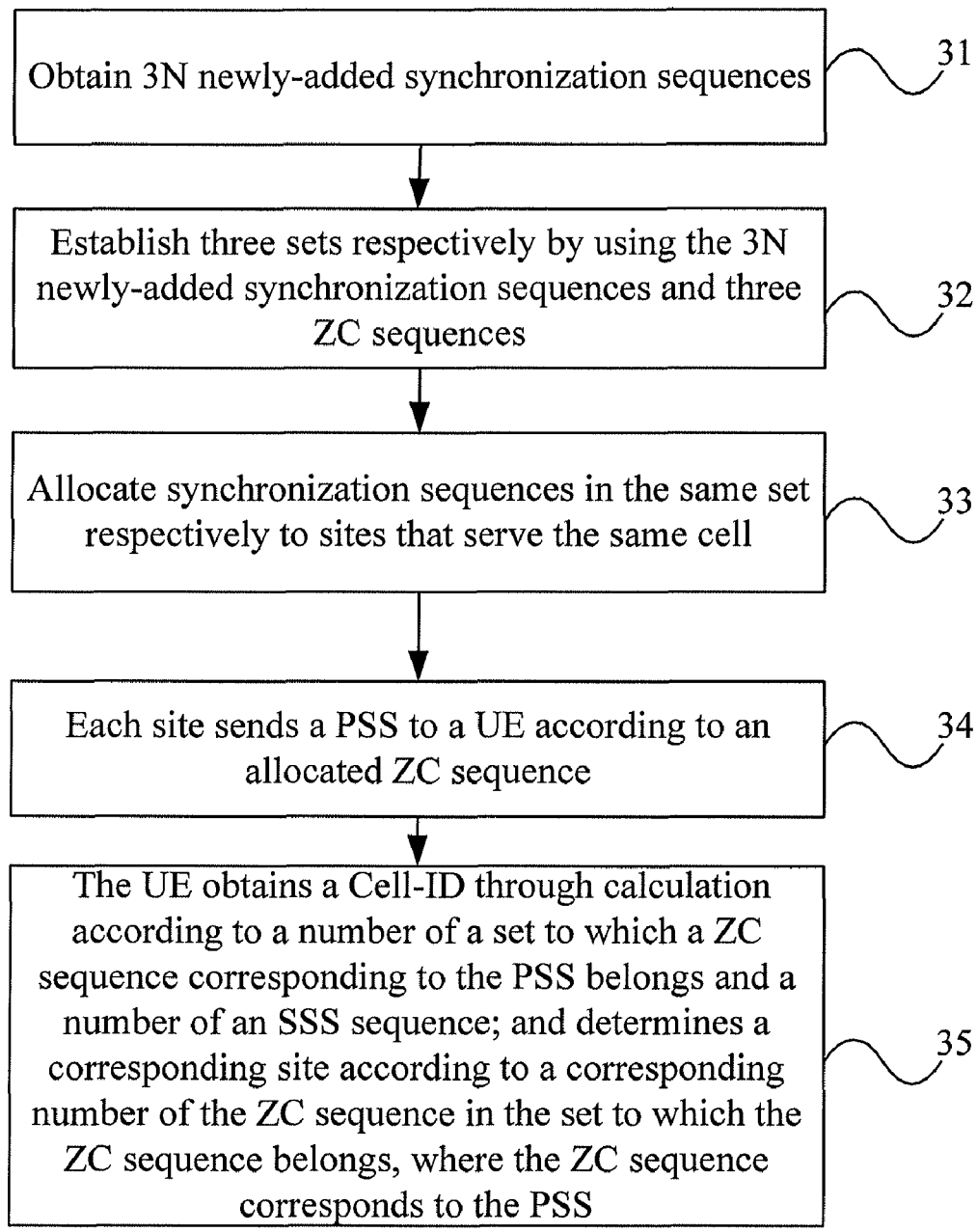
FIG. 3 is a schematic flow chart of a method according to the second embodiment.

FIG. 3 is a schematic flow chart of a method according to the second embodiment. In this embodiment, sites that need to share a Cell-ID are one base station and N AUs, where the base station and the N AUs serve the same cell.

This embodiment includes:

Step 31: Obtain 3N (in this embodiment, N=2 is taken as an example) newly-added synchronization sequences.

The synchronization sequences may be obtained by using the following manner: Use a root other than 25, 29, or 34 to generate a 63-bit ZC sequence with low complexity. Determine N sequences in the generated 63-bit ZC sequence, where the N sequences have better cross correlation with a synchronization sequence sl and better cross correlation with each other. The length of the N sequences is shortened to 62 bits (generally, remove an intermediate bit) and then used as $x1, x2, \ldots,$ and $x(N)$ respectively. By using a similar manner, respectively obtain $x(N+1), x(N+2), \ldots,$ and $x(2N)$ that correspond to s2 and $x(2N+1), x(2N+2), \ldots$ and $x(3N)$ that correspond to s3.

Definitely, the newly-added synchronization sequences are not limited to ZC sequences, and may also be other pseudo random sequences.

Step 32: Establish three sets respectively by using the 3N newly-added synchronization sequences and three ZC sequences.

Specifically, the following sets are formed:

$$S1=\{s1, x1, x2, \ldots, x(N)\};$$

$$S2=\{s2, x(N+1), x(N+2), \ldots, x(2N)\}; \text{ and}$$

$$S3=\{s3, x(2N+1), x(2N+2), \ldots, x(3N)\};$$

s1, s2, and s3 are ZC sequences that correspond to roots 23, 29, and 34 respectively; x1, x2, . . . , and x(3N) are the preceding 3N newly-added synchronization sequences. The newly-added synchronization sequences may be ZC sequences.

Step 33: Allocate synchronization sequences in the same set respectively to sites that serve the same cell.

For example, allocate s1 to an AU that directs to the cell-1 and is on the base station, allocate x1 to an AU-11, and allocate x2 to an AU-12. Allocate s2 to an AU that directs to the cell-2 and is on the base station, allocate x3 to an AU-21, and allocate x4 to an AU-22. Allocate s3 to an AU that directs to the cell-3 and is on the base station, allocate x5 to an AU-31, and allocate x6 to an AU-32.

Step 34: Each site sends a PSS to a UE according to an allocated ZC sequence.

The site may send specific content of the ZC sequence to the UE, and the site may also send a number of the ZC sequence to the UE.

Sequence information may be determined according to a number of a sequence set or a number of a sequence. It may be considered that information that the number of the sequence set or the number of the sequence represents is equivalent to a corresponding sequence set or sequence.

Step 35: The UE obtains a Cell-ID through calculation according to a number of a set to which a ZC sequence corresponding to the PSS belongs and a number of an SSS sequence; and determines a corresponding site according to a corresponding number of the ZC sequence in the set to which the ZC sequence belongs, where the ZC sequence corresponds to the PSS.

Because the number of the set is used by the UE to calculate a Cell-ID, sequences in the same set correspond to the same Cell-ID. In addition, sequences in the set correspond to different AU-IDs, which may be used to distinguish sites. For example, in the cell-1, a UE receives a PSS sent from an antenna (a site-1) that directs to the cell-1 and is on the base station and a corresponding sequence is sl; the UE receives a PSS sent from the AU-11 (a site-2) and a corresponding sequence is x1; and the UE receives a PSS sent from the AU-12 (a site-3) and a corresponding sequence is x2. The UE may know, according to a pre-configured set relationship, a number of the set S1 to which s1, x1, and x2 belong. Then, the number of S1 is used as $N_{ID}^{(2)}$, and a Cell-ID is obtained according to a calculation formula of the Cell-ID. In addition, because serial numbers of s1, x1, and x2 in the set S1 are different, according to the serial numbers (AU-IDs corresponding to respective sites) of s1, x1, and x2 in the set S1, it may be known that a corresponding signal is sent by which site, thus ensuring that data is properly processed.

The preceding is described by taking the PSS as an example. The preceding principle is also applicable to an SSS, and is applicable to a scenario where respective sites correspond to the same PSS number for the SSS. At this time, 168 sets need to be established, and each synchronization sequence in each set is obtained by assembling two 31-bit m sequences.

Alternatively, with reference to the preceding PSS and SSS, the PSS and SSS are extended simultaneously, so that multiple sites correspond to the same Cell-ID and the multiple sites may be distinguished by using AU-IDs.

Referring to FIG. 2, multiple AUs that share a Cell-ID (Cell-ID0) are geographically-distributed sites and these AUs have respective AU-IDs (AU-ID0, AU-ID1, and AU-ID2). When these AUs are RRUs, these AUs may be connected with a Base Band Unit (BBU) through an optical fiber. When a UE is located in a cooperative area, multiple sites may serve the same UE in a cooperative manner (the cooperative manner may be simply combined sending or receiving, and may also be such a manner as cooperative beam forming). A handover procedure in which a high layer is involved does not need to be enabled because multiple sites involved in cooperation have the same Cell-ID. During uplink cooperative transmission, multiple AUs transmit received signals back to the same BBU for combined processing. During downlink cooperative transmission, the BBU controls and distributes data that needs to be sent by each AU to implement cooperative sending.

In this embodiment, the PSS determines the Cell-ID and AU-ID. When multiple sites have the same SSS number, the multiple sites may correspond to the same Cell-ID, so that a problem caused by different Cell-IDs is avoided and a system overhead is decreased.

Figure 4:
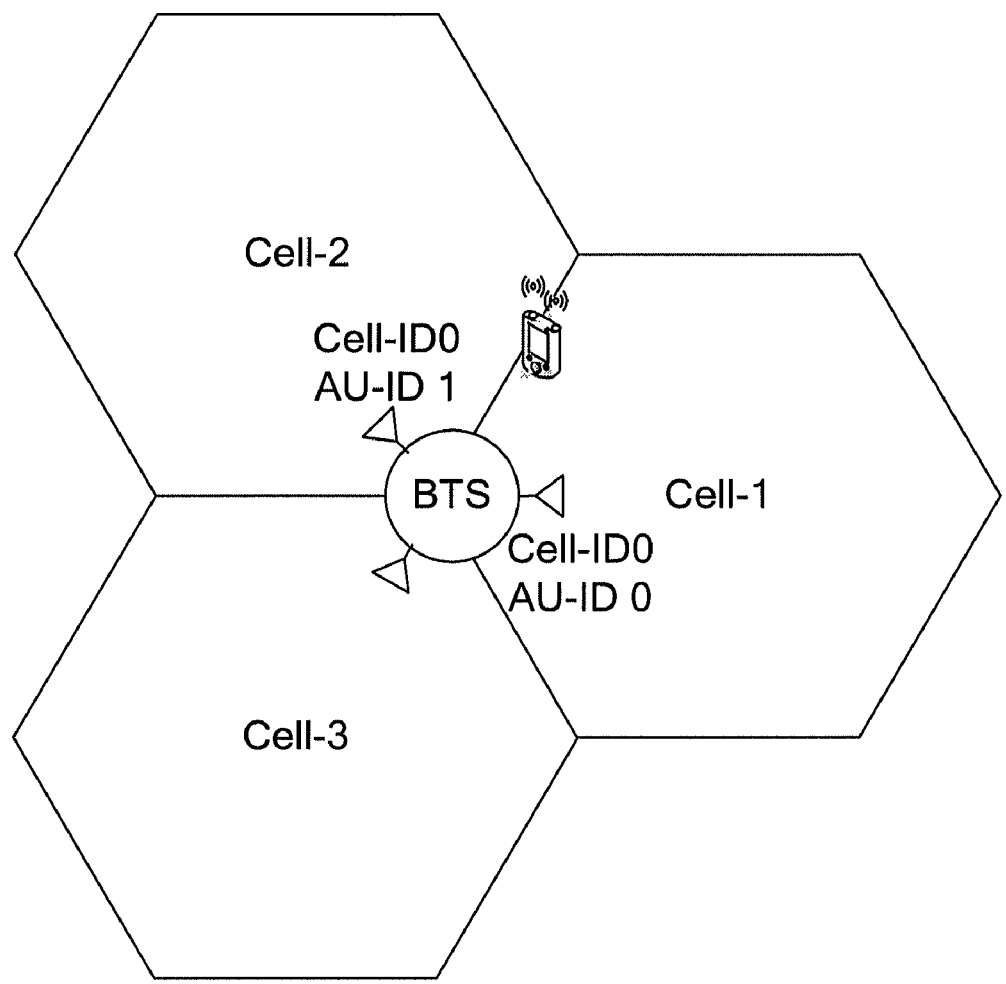
FIG. 4 is a schematic structural diagram of a system according to a third embodiment.

FIG. 4 is a schematic structural diagram of a system according to a third embodiment. Referring to FIG. 4, the system includes a base station and three cells served by the base station, that is, a cell-1, a cell-2, and a cell-3. The base station includes three directions, and each direction corresponds to a site. It is assumed that an antenna of the cell-1 to which the base station directed and an antenna of the cell-2 to which the base station is directed need to share a Cell-ID.

Figure 5:
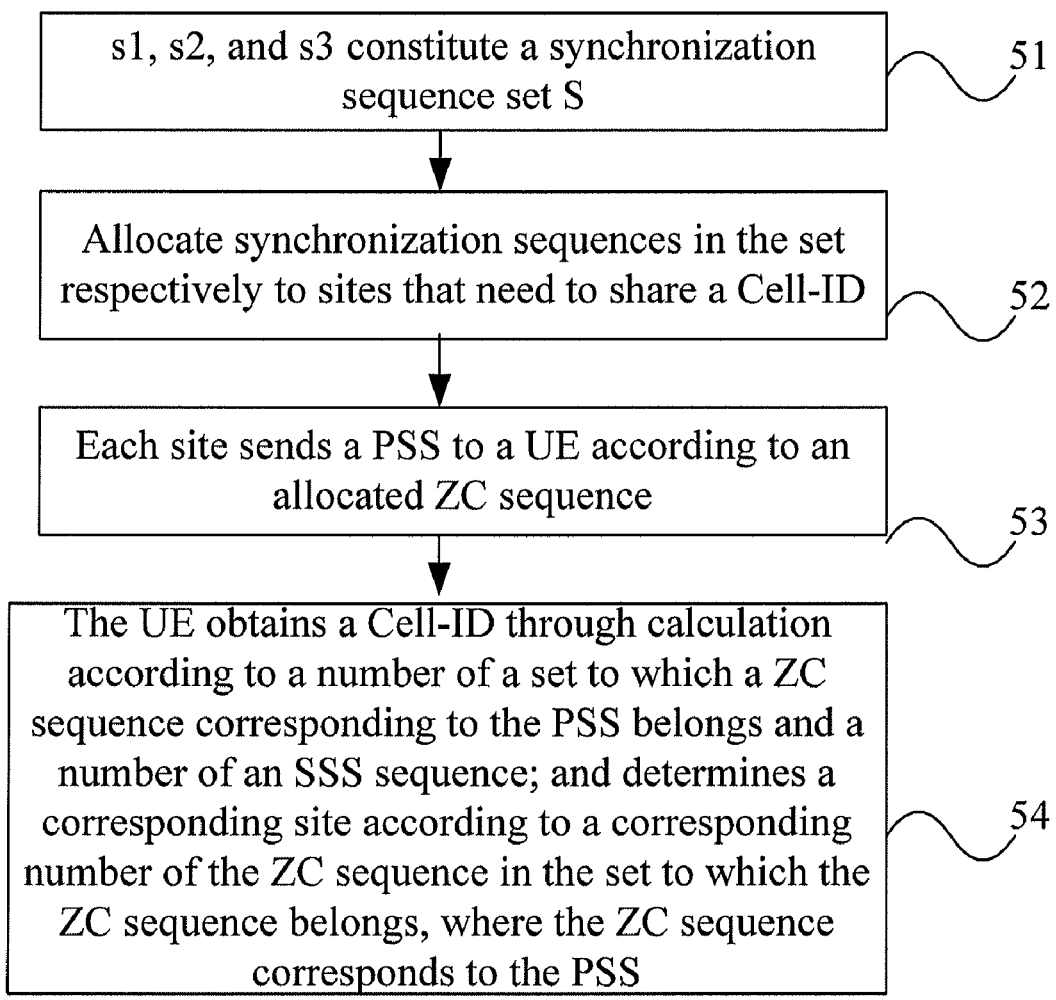
FIG. 5 is a schematic flow chart of a method according to the third embodiment.

FIG. 5 is a schematic flow chart of a method according to the third embodiment. In this embodiment, sites that need to share a Cell-ID are located in the same geographical location but have different directions.

This embodiment includes:

Step 51: s1, s2, and s3 constitute a synchronization sequence set S={s1, s2, s3}.

s1, s2, and s3 are respectively ZC sequences that correspond to roots 23, 29, and 34.

Step 52: Allocate synchronization sequences in the set respectively to sites that need to share a Cell-ID.

For example, N=1 is taken as an example. Allocate s1 to an AU that directs to the cell-1 and is on the base station, and allocate s2 to an AU that directs to the cell-2 and is on the base station. When N=2, allocate s1 to the AU that directs to the cell-1 and is on the base station, allocate s2 to the AU that directs to the cell-2 and is on the base station, and allocate s3 to an AU that directs to the cell-3 and is on the base station.

Step 53: Each site sends a PSS to a UE according to an allocated ZC sequence.

The site may send specific content of the ZC sequence to the UE, and the site may also send a number of the ZC sequence to the UE.

Step 54: The UE obtains a Cell-ID through calculation according to a number of a set to which a ZC sequence corresponding to the PSS belongs and a number of an SSS sequence; and determines a corresponding site according to a corresponding number of the ZC sequence in the set to which the ZC sequence belongs, where the ZC sequence corresponds to the PSS.

Because the number of the set is used by the UE to calculate a Cell-ID, sequences in the same set correspond to the same Cell-ID. In addition, sequences in the set correspond to different AU-IDs, which may be used to distinguish sites. For example, in the cell-1, a UE receives a PSS sent from the AU (a site-1) that directs to the cell-1 and is on the base station and a corresponding sequence is s1; and in the cell-2, the UE receives a PSS sent from an AU-2 (a site-2) that directs to the cell-2 and is on the base station and a corresponding sequence is s2. The UE may know, according to a pre-configured set relationship, a number of the set S to which s1 and s2 belong. Then, the number of S is used as $N_{ID}^{(2)}$, and a Cell-ID is obtained according to a calculation formula of the Cell-ID. In addition, because serial numbers of s1 and s2 in the set S are different, according to the serial numbers (AU-IDs corresponding to respective sites) of s1 and s2 in the set S, it may be known that a corresponding signal is sent by which site, thus ensuring that data is properly processed.

Referring to FIG. 4, the same base station directs to two neighboring areas through two antennas, where the two neighboring areas are served by the same base station. The base station and a corresponding direction may be considered as a site. These two sites may share a Cell-ID (a Cell-ID0), but these two sites are distinguished by using different AU-IDs (an AU-ID0 and an AU-ID1). When a UE is located at the edge of two areas, because they share the same Cell-ID, cooperation of a high layer such as an RRC are not needed. Cooperative data sending processing needs to be performed only at a media access control (MAC) layer and a physical layer (PHY). In this way, cooperative communication that has low complexity, occupies less control resources, and has good transmission performance may be implemented.

In this embodiment, the PSS determines the Cell-ID and AU-ID. When multiple sites have the same SSS number, the multiple sites may correspond to the same Cell-ID, so that a problem caused by different Cell-IDs is avoided and a system overhead is decreased.

In another aspect of the preceding embodiment, if it is described from a UE, the following step is executed:

receiving synchronization signals sent from multiple sites, where synchronization sequences that correspond to the synchronization signals sent from multiple sites belong to the same synchronization sequence set.

When the multiple sites are one base station and N AUs, where the base station and the N AUs serve the same cell, the synchronization signal refers to a primary synchronization signal (PSS) or a secondary synchronization signal (SSS); or, when the multiple sites are located in the same geographic location but have different directions, the synchronization signal refers to a PSS, and the number of the multiple sites is equal to or smaller than 3.

A Cell-ID is determined according to the synchronization sequence set, and an AU-ID is determined according to the synchronization sequence. Then, the Cell-ID and the AU-ID may be sent to the multiple sites, where the multiple sites correspond to the same Cell-ID.

Figure 6:
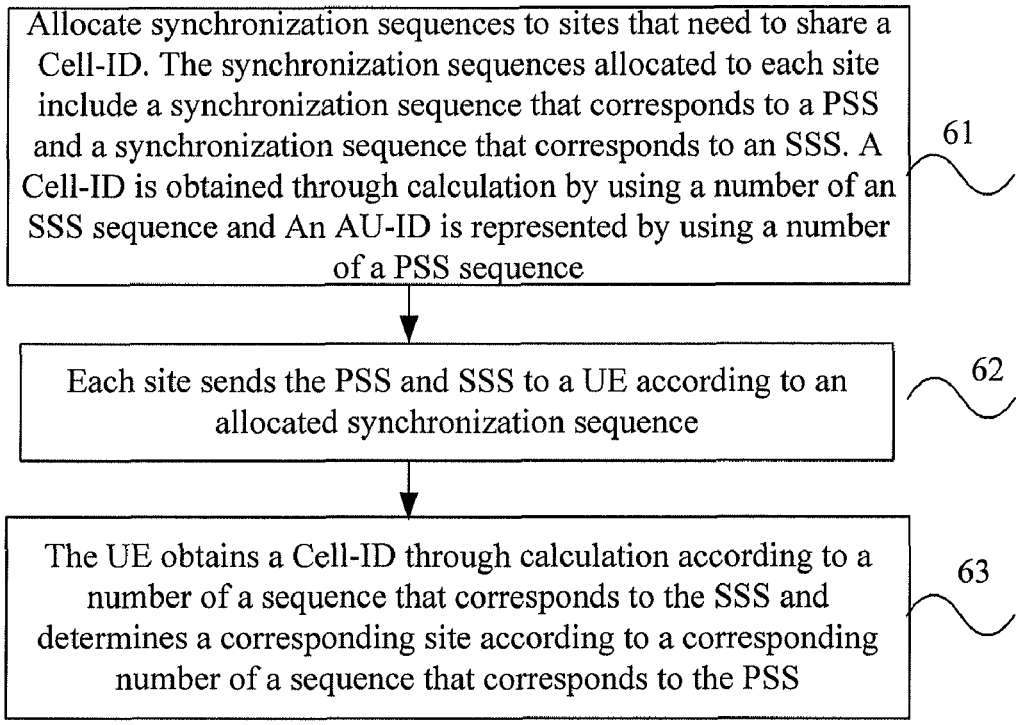
FIG. 6 is a schematic flow chart of a method according to a fourth embodiment.

In the preceding embodiment, the multiple sites corresponding to the same Cell-ID is implemented by establishing a set, and may also be implemented in a way in which the Cell-ID is determined by the SSS rather than PSS+SSS, which is specifically as follows:

FIG. 6 is a schematic flow chart of a method according to a fourth embodiment. In this embodiment, multiple sites belonging to the same cell group is taken as example. At this time, the multiple sites correspond to the same SSS number.

Step 61: Allocate synchronization sequences to sites that need to share a Cell-ID. The synchronization sequences allocated to each site include a synchronization sequence that corresponds to a PSS and a synchronization sequence that corresponds to an SSS. A Cell-ID is obtained through calculation by using a number of an SSS sequence and An AU-ID is represented by using a number of a PSS sequence.

Step 62: Each site sends the PSS and SSS to a UE according to an allocated synchronization sequence.

The site may send specific content of the PSS sequence and the SSS sequence to the UE, and the site may also send the number of the PSS sequence and the number of the SSS sequence to the UE.

Step 63: The UE obtains a Cell-ID through calculation according to a number of a sequence that corresponds to the SSS and determines a corresponding site according to a corresponding number of a sequence that corresponds to the PSS.

For example, a sequence that corresponds to the SSS and is sent from an antenna (a site-1) that directs to a cell-1 and is on a base station is SSS1 and a sent sequence that corresponds to the PSS is s1; a sequence that corresponds to the SSS and is sent from a site-2 is SSS1 and a sent sequence that corresponds to the PSS is s2; and a sequence that corresponds to the SSS and is sent from a site-3 is SSS1 and a sent sequence that corresponds to the PSS is s3. Three sites correspond to the same Cell-ID=1, and are distinguished by using s1, s2, and s3.

In another aspect of this embodiment, if it is described from a UE, the following steps are executed:

receiving synchronization signals sent from multiple sites, where the synchronization signals include a PSS and an SSS, and respective sites have the same PSS but different SSSs; and determining a Cell-ID according to the SSS and determining an AU-ID according to the PSS. Afterward, the Cell-ID and the AU-ID may be sent to the multiple sites, where the multiple sites correspond to the same Cell-ID.

In this embodiment, the SSS determines the Cell-ID. When multiple sites have the same SSS number, the multiple sites may correspond to the same Cell-ID, so that a problem caused by different Cell-IDs is avoided and a system overhead is decreased.

In the preceding embodiment, after the multiple sites correspond to the same Cell-ID, the following multi-point cooperative communication may be performed:

1. Downlink data channel cooperation among multiple sites: Because the multiple sites share the same Cell-ID and data scrambling is the same, for a user at the edge of a site, simplified processing may be performed at a downlink air interface, and high layers such as RRC and core network do not need to be involved in cooperation. For example:

a. Two sites send the same signal to an edge user on the same time frequency resource and obtain power gains and channel diversity gains;

b. Radio Resource Management (RRM) selects a site with good coverage to send a signal to the edge user. A neighboring site does not send any signal on this time frequency resource, which reduces interference.

2. In uplink, because of the same cell, allocation of an RACH sequence and a UE-ID are the same. Signal received by different sites from the same user may be processed in a combined manner, which is consistent with a method of conventional uplink macro diversity.

Figure 7:
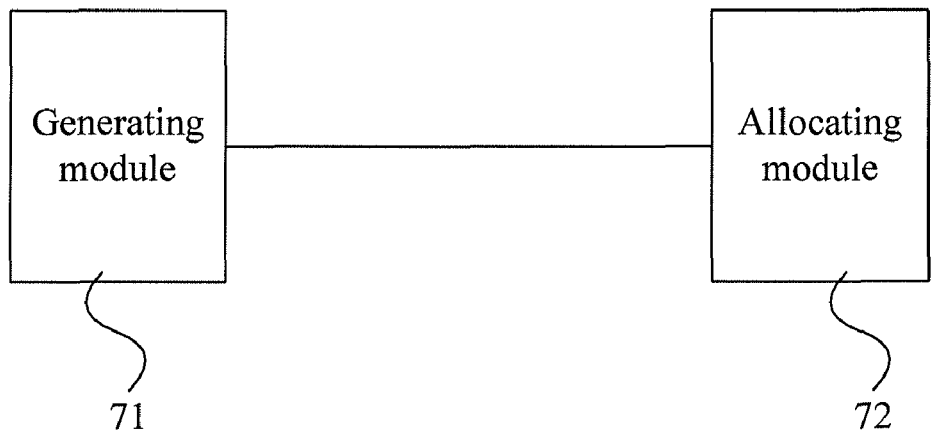
FIG. 7 is a schematic structural diagram of an apparatus according to a fifth embodiment.

FIG. 7 is a schematic structural diagram of an apparatus according to a fifth embodiment. The apparatus includes a generating module 71 and an allocating module 72. The generating module 71 is configured to obtain a synchronization sequence set, where the synchronization sequence set is used to determine a Cell-ID. The allocating module 72 is configured to allocate synchronization sequences in the same synchronization sequence set to multiple sites, where the synchronization sequences in the same synchronization sequence set are used to determine AU-IDs of respective sites.

This embodiment may further include a determining module. The determining module is configured to determine sites that need to share a Cell-ID, so that the synchronization sequences in the same synchronization sequence set are allocated to the sites that need to share the Cell-ID.

The allocating module 72 may include a first unit and a second unit. The first unit is configured to select N+1 synchronization sequences from the same synchronization sequence set, where the N+1 synchronization sequences correspond to different AU-IDs, and the N+1 is the number of the sites that need to share the Cell-ID. The second unit is configured to allocate the N+1 synchronization sequences to the sites that need to share the Cell-ID respectively, where the sites that need to share the Cell-ID send synchronization signals according to allocated synchronization sequences.

If the sites that need to share the Cell-ID are a base station and N AUs, where the base station and the N AUs serve the same cell, and the synchronization signal is a PSS, the generating module 71 includes: a third unit and a fourth unit. The third unit is configured to obtain 3N newly-added synchronization sequences. The fourth unit is configured to establish sets S1, S2, and S3, where S1={s1, x1, x2, . . . , x(N)}, S2={s2, x(N+1), x(N+2), . . . , x(2N)}, and S3={s3, x(2N+1), x(2N+2), . . . , x(3N)}. s1, s2, and s3 are respectively ZC sequences that correspond to roots 25, 29, and 34. x1, x2, . . . , and x(3N) are newly-added synchronization sequences.

Specifically, the third unit may further include a first sub-unit and a second sub-unit. The first sub-unit is configured to generate a 63-bit Zadoff-Chu sequence by using a root other than 25, 29, or 34, and obtain Zadoff-Chu sequences that have pairwise cross correlation; and the second sub-unit is configured to obtain N Zadoff-Chu sequences from the Zadoff-Chu sequences that have pairwise cross correlation as x1, x2, . . . , and x(N), where the N Zadoff-Chu sequences have cross correlation with s1; obtain N Zadoff-Chu sequences from the Zadoff-Chu sequences that have pairwise cross correlation as x(N+1), x(N+2), . . . , and x(2N), where the N Zadoff-Chu sequences have cross correlation with s2; and obtain N Zadoff-Chu sequences from the Zadoff-Chu sequences that have pairwise cross correlation as x(2N+1), x(2N+2), . . . , and x(3N), where the N Zadoff-Chu sequences have cross correlation with s3.

If the sites that need to share the Cell-ID are a base station and N AUs, where the base station and the N AUs serve the same cell, and the synchronization signal is an SSS, the generating module 71 includes: a fifth unit and a sixth unit. The fifth unit is configured to obtain 168N newly-added synchronization sequences. The sixth unit is configured to establish 168 sets, where each set includes one existing SSS sequence and N newly-added synchronization sequences.

If the sites that need to share the Cell-ID are located in the same geographical location but have different directions, the synchronization signal is a PSS, and N is smaller than or equal to 2, the generating module is specifically configured to form a synchronization sequence set that includes s1, s2, and s3. s1, s2, and s3 are root 25 respectively.

For specific functions of the preceding modules, reference may be made to the method embodiments, which is not described here again.

Figure 8:
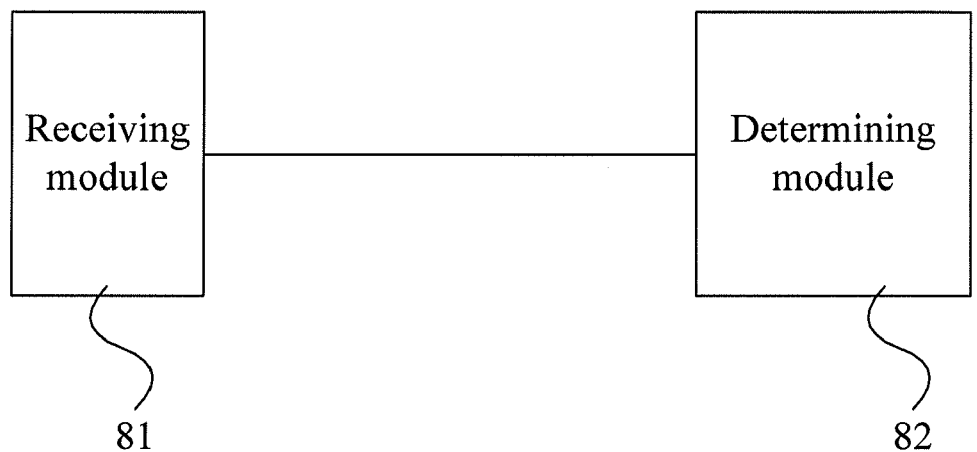
FIG. 8 is a schematic structural diagram of a UE according to a sixth embodiment.

In another aspect, a UE may further be provided. FIG. 8 is a schematic structural diagram of a UE according to a sixth embodiment. The UE includes a receiving module 81 and a determining module 82. The receiving module 81 is configured to receive synchronization signals sent from multiple sites, where synchronization sequences that correspond to the synchronization signals sent from multiple sites belong to the same synchronization sequence set. The determining module 82 is configured to determine a Cell-ID according to the synchronization sequence set and determine an AU-ID according to the synchronization sequences, where the multiple sites correspond to the same Cell-ID.

In this embodiment, synchronization sequences are allocated to sites in cooperative communication and Cell-IDs obtained by the UE according to the synchronization sequences are the same. In this way, sites in cooperative communication may correspond to the same Cell-ID, thus decreasing a system overhead.

Figure 9:
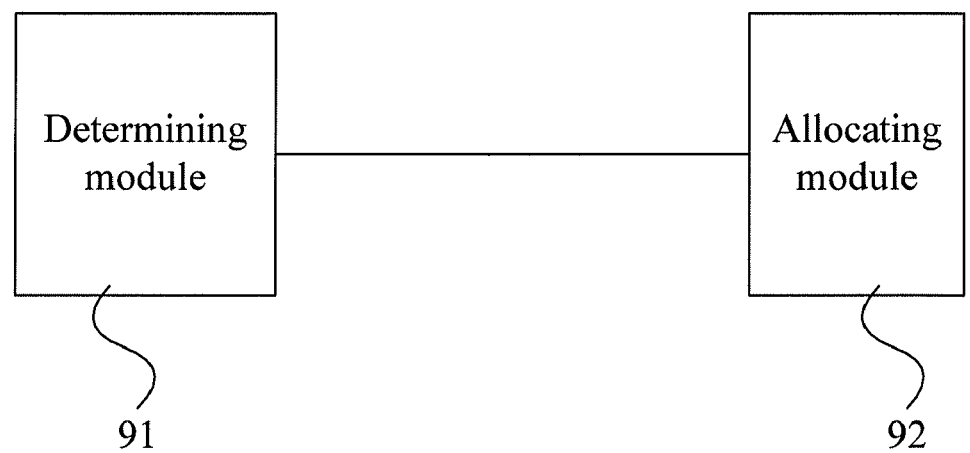
FIG. 9 is a schematic structural diagram of an apparatus according to a seventh embodiment.

FIG. 9 is a schematic structural diagram of an apparatus according to a seventh embodiment. The apparatus includes a determining module 91 and an allocating module 92. The determining module 91 is configured to determine sites that need to share a Cell-ID. The allocating module 92 is configured to allocate a secondary synchronization signal (SSS) sequence and the same primary synchronization signal (PSS) sequence to the sites, where the SSS sequence is used to determine a Cell-ID and the PSS sequence is used to determine AU-IDs of respective sites.

For specific functions of the preceding modules, reference may be made to the method embodiments, which is not described here again.

Figure 10:
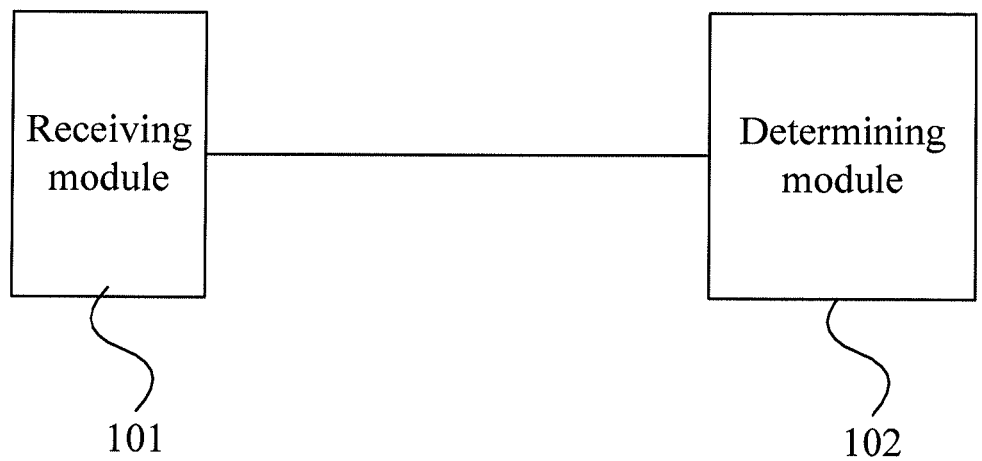
FIG. 10 is a schematic structural diagram of a UE according to an eighth embodiment.

In another aspect, a UE may further be provided. FIG. 10 is a schematic structural diagram of a UE according to an eighth embodiment. The UE includes a receiving module 101 and a determining module 102. The receiving module 101 is configured to receive synchronization signals sent from multiple sites, where the synchronization signals include a PSS and an SSS, and respective sites have the same PSS but different SSSs. The determining module 102 is configured to determine a Cell-ID according to the SSS and determine an AU-ID according to the PSS, where the multiple sites correspond to the same Cell-ID.

In this embodiment, the SSS determines the Cell-ID. When multiple sites have the same SSS number, the multiple sites may correspond to the same Cell-ID, so that a problem caused by different Cell-IDs is avoided and a system overhead is decreased.

Figure 11:
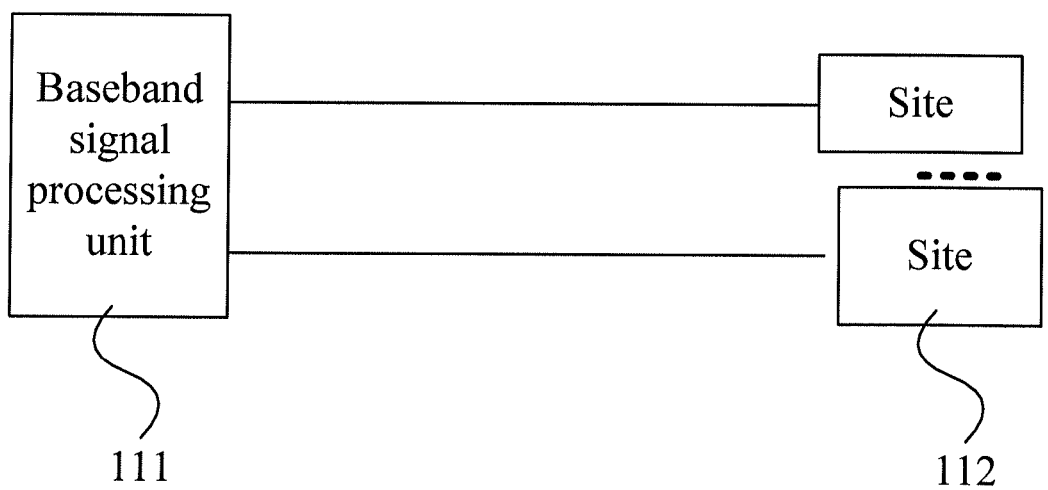
FIG. 11 is a schematic structural diagram of a system according to a ninth embodiment.

An embodiment further provides a mobile communication system. FIG. 11 is a schematic structural diagram of a system according to a ninth embodiment. The system includes: a baseband signal processing unit 111 and multiple sites 112. The baseband signal processing unit 111 allocates synchronization sequences in the same synchronization sequence set to multiple sites, where the synchronization sequence set is used to determine a cell-ID (Cell-ID), the multiple sites 112 correspond to the same Cell-ID, and synchronization sequences in the same synchronization sequence set are used to determine antenna unit IDs (AU-ID) of respective sites.

In this embodiment, the baseband signal processing unit may further be a baseband processing unit. The multiple sites may all belong to the same cell, and the multiple sites may also belong to multiple cells respectively. The communication system may be used to implement the methods provided in the preceding embodiments.

With the method and apparatus for sharing a cell-ID between sites in a cooperative communication system, by allocating synchronization sequences to the sites, a UE may obtain the same Cell-ID through calculation according to the synchronization sequences. In this way, sites in cooperative communication correspond to the same Cell-ID and a system overhead is decreased.

Persons of ordinary skill in the art may understand that all or a part of steps of the preceding method embodiments may be implemented by a program instructing relevant hardware. The preceding program may be stored in a computer readable storage medium. When the program is executed, the steps of the preceding method embodiments are executed. The preceding storage medium includes any medium capable of storing program codes, such as a ROM, a RAM, a magnetic disk, or a compact disk.

What is claimed is:

1. A method of sharing a cell-ID between sites in cooperative communication, comprising:
   determining sites that need to share one cell-ID, one site having multiple cells;
   obtaining one synchronization sequence set, wherein a serial number of the synchronization sequence set is used to determine one cell-ID; and
   allocating synchronization sequences in a same synchronization sequence set to multiple sites so that the multiple sites share one cell-ID, wherein the synchronization sequences in the same synchronization sequence set are used to determine antenna unit IDs (AU-ID) of respective sites.

2. The method according to claim 1, wherein, allocation of the synchronization sequences in the same synchronization sequence set to the multiple sites comprises:
   selecting N+1 synchronization sequences from the same synchronization sequence set, wherein the N+1 synchronization sequences correspond to different AU-IDs, and N+1 is the number of the sites that need to share the Cell-ID;
   allocating the N+1 synchronization sequences respectively to the sites that need to share the Cell-ID, wherein the sites that need to share the Cell-ID send synchronization signals according to allocated synchronization sequences.

3. The method according to claim 2, wherein the sites that need to share the Cell-ID are a base station and N antenna units (AU), wherein the base station and the N antenna units (AU) serve a same cell, the synchronization signal is a primary synchronization signal (PSS), and obtaining of the synchronization sequence set comprises:
   obtaining 3N newly-added synchronization sequences; and
   establishing sets S1, S2, and S3, wherein S1={s1, x1, x2, ..., x(N)}, S2={s2, x(N+1), x(N+2), ..., x(2N)}, and S3={s3, x(2N+1), x(2N+2), ..., x(3N)}, s1, s2, and s3 are respectively Zadoff-Chu sequences that correspond to roots 25, 29, and 34, and x1, x2, ..., and x(3N) are the newly-added synchronization sequences.

4. The method according to claim 3, wherein, obtaining of the 3N newly-added synchronization sequences comprises:
   generating a 63-bit Zadoff-Chu sequence by using a root other than 25, 29, or 34, and obtaining Zadoff-Chu sequences that have pairwise cross correlation;
   obtaining N Zadoff-Chu sequences from the Zadoff-Chu sequences that have pairwise cross correlation as x1, x2, ..., and x(N), wherein the N Zadoff-Chu sequences have cross correlation with s1;
   obtaining N Zadoff-Chu sequences from the Zadoff-Chu sequences that have pairwise cross correlation as x(N+1), x(N+2), ..., and x(2N), wherein the N Zadoff-Chu sequences have cross correlation with s2; and
   obtaining N Zadoff-Chu sequences from the Zadoff-Chu sequences that have pairwise cross correlation as x(2N+1), x(2N+2), ..., and x(3N), wherein the N Zadoff-Chu sequences have cross correlation with s3.

5. The method according to claim 2, wherein the sites that need to share the Cell-ID are a base station and N AUs, wherein the base station and the N AUs serve a same cell, the synchronization signal is a secondary synchronization signal (SSS), and obtaining of the synchronization sequence set comprises:
   obtaining 168N newly-added synchronization sequences; and
   establishing 168 sets, wherein each set comprises one existing SSS sequence and N newly-added synchronization sequences.

6. The method according to claim 2, wherein, the sites that need to share the Cell-ID are located in the same geographical location, but have different directions, and if the synchronization signal is a PSS and N is smaller than or equal to 2, obtaining of the synchronization sequence set comprises:
   forming a synchronization sequence set by using s1, s2, and s3, wherein s1, s2, and s3 are respectively Zadoff-Chu sequences that correspond to roots 25, 29, and 34.

7. An apparatus for sharing a cell-ID between sites in cooperative communication, comprising:
   a generating module configured to obtain one synchronization sequence set, wherein a serial number of the synchronization sequence set is used to determine one cell-ID;
   a determining module configured to determine sites that need to share one cell-ID, and allocate the synchronization sequences in the same synchronization sequence set to the sites that need to share the cell-ID; and
   an allocating module configured to allocate synchronization sequences in a same synchronization sequence set to multiple sites that need to share the cell-ID, wherein the synchronization sequences in the same synchronization sequence set are used to determine antenna unit IDs (AU-ID) of respective sites.

8. The apparatus according to claim 7, wherein, the allocating module comprises:
   a first unit configured to select N+1 synchronization sequences from the same synchronization sequence set, wherein the N+1 synchronization sequences correspond to different AU-IDs, and the N+1 is the number of the sites that need to share the Cell-ID; and
   a second unit configured to allocate the N+1 synchronization sequences respectively to the sites that need to share the Cell-ID, wherein the sites that need to share the Cell-ID send synchronization signals according to allocated synchronization sequences.

9. The apparatus according to claim 8, wherein the sites that need to share the Cell-ID are a base station and N antenna units (AU), wherein the base station and the N antenna units (AU) serve a same cell, and the synchronization signal is a primary synchronization signal (PSS), and the generating module comprises:
   a third unit configured to obtain 3N newly-added synchronization sequences; and
   a fourth unit configured to establish sets S1, S2, and S3, wherein S1={s1, x1, x2, ..., x(N)}, S2={s2, x(N+1), x(N+2), ..., x(2N)}, and S3={s3, x(2N+1), x(2N+2), ..., x(3N)}, s1, s2, and s3 are respectively Zadoff-Chu sequences that correspond to roots 25, 29, and 34, and x1, x2, ..., and x(3N) are newly-added synchronization sequences.

10. The apparatus according to claim 9, wherein the third unit comprises:
 a first sub-unit configured to generate a 63-bit Zadoff-Chu sequence by using a root other than 25, 29, or 34, and obtain Zadoff-Chu sequences that have pairwise cross correlation; and
 a second sub-unit configured to:
  obtain N Zadoff-Chu sequences from the Zadoff-Chu sequences that have pairwise cross correlation as x1, x2, . . . , and x(N), wherein the N Zadoff-Chu sequences have cross correlation with s1;
  obtain N Zadoff-Chu sequences from the Zadoff-Chu sequences that have pairwise cross correlation as x(N+1), x(N+2), . . . , and x(2N), wherein the N Zadoff-Chu sequences have cross correlation with s2; and
  obtain N Zadoff-Chu sequences from the Zadoff-Chu sequences that have pairwise cross correlation as x(2N+1), x(2N+2), . . . , and x(3N), wherein the N Zadoff-Chu sequences have cross correlation with s3.

11. The apparatus according to claim 8, wherein the sites that need to share the Cell-ID are a base station and N AUs, wherein the base station and the N AUs serve a same cell, and the synchronization signal is a secondary synchronization signal (SSS), and the generating module comprises:
 a fifth unit configured to obtain 168N newly-added synchronization sequences; and
 a sixth unit configured to establish 168 sets, wherein each set comprises one existing SSS sequence and N newly-added synchronization sequences.

12. The apparatus according to claim 8, wherein the sites that need to share the Cell-ID are located in the same geographical location, but have different directions, and when the synchronization signal is a PSS and N is smaller than or equal to 2, the generating module is configured to form a synchronization sequence set by using s1, s2, and s3, wherein s1, s2, and s3 are respectively Zadoff-Chu sequences that correspond to roots 25, 29, and 34.

13. A method for determining a cell-ID of a site in cooperative communication, comprising:
 receiving synchronization signals from multiple sites, wherein the synchronization signals comprise a primary synchronization signal (PSS) and a secondary synchronization signal (SSS), and respective sites have a same PSS but different SSSs; and
 determining a cell-ID according to the SSS and determining antenna unit IDs (AU-ID) according to the PSS, wherein the multiple sites correspond to the same Cell-ID.

* * * * *